United States Patent [19]

Boudreault

[11] 4,231,490

[45] Nov. 4, 1980

[54] CONTAINER

[75] Inventor: Jean-Pierre Boudreault, Mont St. Hilaire, Canada

[73] Assignee: Gaylord Regethermic Canada Ltd., Montreal, Canada

[21] Appl. No.: 760,131

[22] Filed: Jan. 17, 1977

[51] Int. Cl.³ ..................... B65D 43/06; B65D 53/06; B65D 25/28
[52] U.S. Cl. ................................ 220/354; 220/94 R; 220/228
[58] Field of Search .................... 220/354, 228, 94 R, 220/358, 228, 359, 354, 200, 352; 215/200

[56] References Cited

U.S. PATENT DOCUMENTS

| | | | |
|---|---|---|---|
| 1,157,991 | 10/1915 | Linton | 220/228 X |
| 3,338,456 | 8/1967 | Kinnavy et al. | 220/354 |
| 3,812,997 | 5/1974 | McNally | 220/94 R X |

*Primary Examiner*—Steven M. Pollard
*Attorney, Agent, or Firm*—Swabey, Mitchell, Houle, Marcoux & Sher

[57] ABSTRACT

A lid is described wherein the bowl has a rim with a groove extending about the rim and open to the top. The lid includes a downwardly extending rib coinciding with the groove. The radius of the rib is smaller than the radius of the groove such that when liquid is present in the groove, surface tension will cause adhesion between the diverging surfaces of the groove and the rib.

5 Claims, 3 Drawing Figures

CONTAINER

BACKGROUND OF THE INVENTION

1. Field of the Invention

The present invention relates to containers, and more particularly to liquid containing bowls having open tops with a suitable lid.

2. Description of the Prior Art

In the processing of hospital and other institutional foods, recent developments have been made in the precooking and subsequent hot serving of foods. For instance, it has been found that meals can be prepared hours or even days in advance, and stored in ceramic dishes having metal, especially stainless steel, covers. These dishes with their contents are kept in cold rooms on transportable carts with integrated heaters. When it is necessary to serve a given meal, the heating devices are switched on in order to heat the dishes carried thereon. The dishes are heated by infrared means. The stainless steel covers, which are normally bell-shaped, form an air pocket and retain the food juices and odors as the dish, including the contents thereof, is being reheated.

It has been found, however, that bowls containing liquids such as soups, are more difficult to handle, and the liquid tends to spill as it is being transported.

It is obvious that a screw-on or otherwise fastened lid is not practical since a bowl and its contents, when reheated, is too hot to touch for any short period and, therefore, it is not possible to grip the lid to remove it.

SUMMARY OF THE INVENTION

It is an aim of the present invention to provide a container such as a bowl which, when provided with an easily removable lid, is not subject to spilling.

A construction in accordance with the present invention comprises a bowl, the bowl having a continuous rim traced in a flat plane, a continuous groove defined along the full extent of the rim and opening to the flat plane, at least the root of the groove being concavely arcuate in cross-section and having a first predetermined radius, a lid adapted to sit on the bowl, the lid having a continuous rib on one surface thereof adapted to coincide with the groove in the rim of the bowl, the rib having a height at least greater than the depth of the groove, at least the crest of the rib being convexly arcuate in cross-section and having a second radius smaller than the first radius such that when the bowl contains a liquid and the lid is seated on the rim, the surface tension of the liquid spilled in the groove will provide adhesion between the rib and the root of the groove at the diverging surfaces sufficient to retain the lid on the bowl in a sealing relation.

BRIEF DESCRIPTION OF THE DRAWINGS

Having thus generally described the nature of the invention, reference will now be made to the accompanying drawings, showing by way of illustration, a preferred embodiment thereof, and in which.

DESCRIPTION OF THE PREFERRED EMBODIMENTS

Figure 1:
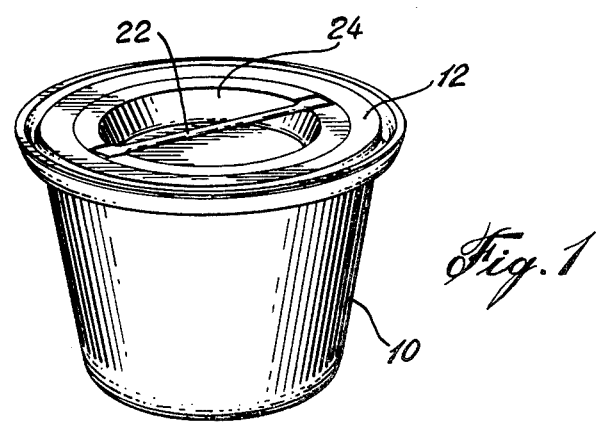
FIG. 1 is a perspective view of the bowl and lid.

Referring now to FIG. 1, there is shown a bowl 10 adapted to contain liquids such as an individual portion of soup for serving. A lid 12 is provided on the bowl 10.

Figure 2:
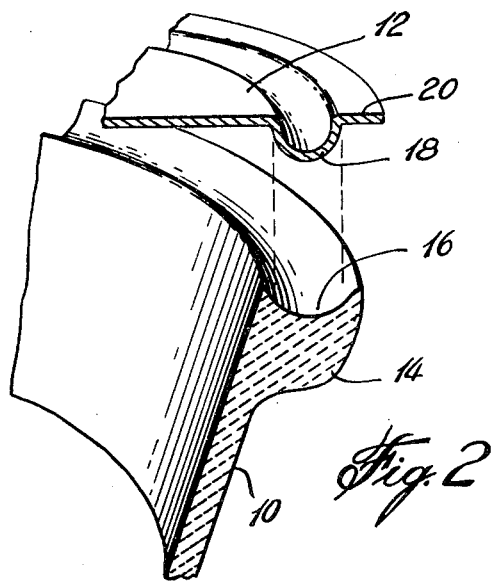
FIG. 2 is a fragmentary perspective view, partly in cross-section, showing the lid elevated from the bowl.
Figure 3:
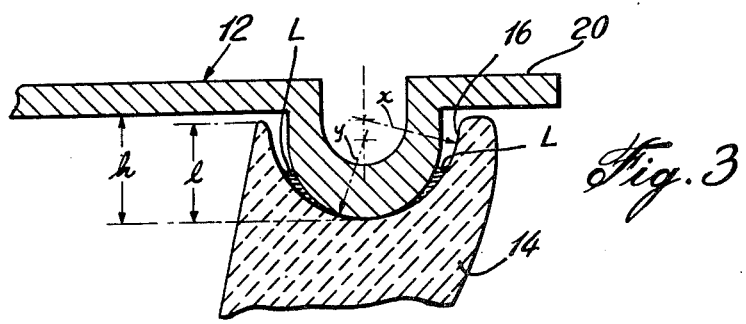
FIG. 3 is an enlarged fragmentary vertical cross-section of a detail thereof.

The bowl 10 preferably is made of ceramic material since in the present case, it is anticipated that such bowls would be useful in institutional feedings, such as in hospitals. The bowl 10 has an upper rim 14 which extends in a circle about the upper edge of the bowl 10. The rim 14 has a concave groove open towards the top, as shown in FIGS. 2 and 3. The root of the groove is smoothly formed to have an arcuate surface in cross-section, the curvature of which is represented by the radius "x". The depth "1" of the groove is also predetermined and will be described later.

A cover or lid 12 is preferably made from stainless steel by stamping methods and has formed therein a rib 18 which coincides with the groove 16 on the bowl 10 to which the lid is adapted to be matched. The lid 12 in the present case has a depressed center surface defined by a skirt 24 and includes a handle 22 extending across the depressed area.

The bowls are adapted to be stacked one on top of the other, and this is the reason for having the flattened handle with the depressed center surface.

The rib 18, which is continuous about the lid 12 near an edge thereof, is formed smoothly such that when placed on the bowl 10, the rib 18 will rest on the root of the groove 16. The convex surface of the rib 18 is arcuately curved as represented by the radius "x". The height of the crest of the rib from the plane of the surface of the lid is represented by the letter "h". It is essential in the production of the lid 12 and the bowl 10 that "y" be $<$ than "x" but that "h" be $<$ than "1". In one example "x" was 5/32" while "y" was 4/32".

The purpose for having "x" smaller than "y" is to ensure that the crest of the rib 18 is in contact with the root of the groove 16, thereby reducing the amount of supporting surface to ensure greater linear contact and increase pressure between the crest of rib 18 and the root of the groove 16. Further, the different radii provide diverging surfaces on either side of the linear contact enhancing the collection of liquid with surface tension effect. It is important also that the height "h" of the rib be greater than the depth of the groove 16 since the lid 12 should be completely supported by the rib 18 and not by the upper edges of the rim 14 pressing underneath the surface of the lid 12. Since manufacturing tolerances are required, particularly when forming the ceramic bowl, it is best to allow sufficient clearances.

The liquid L within the bowl would, as soon as the bowl is moved, slop up and leak into the groove 16 causing the liquid to extend around the groove between the diverging surfaces of the rib 18 and the groove 16. Surface tension between the liquid L and the solid lid 12 and bowl 10 will cause adhesion to the root of the groove 16 such that in tests, at least a force of more than 2 lbs. was required to lift the cover. Such a force is sufficient to prevent any slopping about of the liquid from raising the cover and allowing the liquid to spill out of the bowl.

The container, including the bowl 10 and the lid 12, will be very useful in the recently developed precooking and reheating systems used in hospitals. A ceramic dish is provided with a bell-shaped stainless steel cover. The cooked food is contained in the dish and the dish is carried in a cart having integrated heating means. When it is necessary to serve the food, the heaters integrated in the movable cart are activated so as to heat the individual dishes and then the dish or bowl may be served to the patient.

I claim:

1. A container, including a bowl, the bowl having a rim, a continuous groove defined along the full extent of the rim and opening upwardly, at least the root of the groove being arcuate and having a first radius of curvature, a lid adapted to sit loosely on the bowl, the lid having a continuous rib on one surface thereof resting in the groove, the rib having a height at least greater than the depth of the groove, such that the lid is solely supported by the rib in the groove, at least the crest of the rib being convexly arcuate in cross-section and having a second radius of curvature smaller than the first radius of curvature, so that there is a linear contact between the rib and the groove; such that when the bowl contains a liquid and the lid is seated on the rim, the surface tension of the liquid present in the groove between the rib and the groove at their diverging surfaces will provide a continuous seal on both sides of the linear contact between the rib and the groove so as to enhance the retention of the rib of the lid to the groove on the bowl.

2. A container as defined in claim 1, wherein the lid includes a depressed central surface and a flat handle extends across the depressed central surface.

3. A container as defined in claim 2, wherein the lid is stamped from stainless steel material.

4. A container as defined in claim 2, wherein the radius of the root of the groove is 5/32" and the radius of the crest of the rim on the lid is 4/32".

5. A container as defined in claim 1, wherein the bowl is molded from a ceramic material.

* * * * *